(12) United States Patent
Yeh

(10) Patent No.: US 6,396,409 B1
(45) Date of Patent: May 28, 2002

(54) STATUS INDICATING DEVICE OF A PORTABLE COMPUTER

(75) Inventor: Shih-Ping Yeh, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 09/852,006

(22) Filed: May 10, 2001

(30) Foreign Application Priority Data

May 11, 2000 (TW) ...................................... 89207941 U

(51) Int. Cl.[7] ................................................. G08B 5/22
(52) U.S. Cl. ............................. 340/815.42; 340/815.45; 340/815.47; 340/461; 362/31; 362/32; 362/227; 362/234
(58) Field of Search ....................... 340/815.45, 815.42, 340/461, 815.47; 362/31, 32, 227, 234

(56) References Cited

U.S. PATENT DOCUMENTS

| | | | | |
|---|---|---|---|---|
| 5,101,325 A | * | 3/1992 | Davenport et al. | 362/31 |
| 5,406,268 A | * | 4/1995 | Fullmer | 340/825.42 |
| 5,481,440 A | * | 1/1996 | Oldham et al. | 362/32 |
| 5,761,540 A | * | 6/1998 | White | 396/4 |
| 5,892,599 A | * | 4/1999 | Bahuguna | 359/15 |

* cited by examiner

Primary Examiner—Daniel J. Wu
Assistant Examiner—Tai T. Nguyen
(74) Attorney, Agent, or Firm—Rabin & Berdo, P.C.

(57) ABSTRACT

An indicating device of a portable computer is disclosed. The indicating device utilizes a light guiding board to guide the light emitted from LEDs to indicate different status of the portable computer. The light guiding board includes the first, second, and third surfaces. The light emitted from LEDs is received by the first surface, further reflected by the second surface, and then sent out through the third surface to form a diffusion light and to show the status of the computer.

13 Claims, 3 Drawing Sheets

STATUS INDICATING DEVICE OF A PORTABLE COMPUTER

BACKGROUND OF THE INVENTION

This application incorporates by reference Taiwanese application Serial No. 89207941, Filed May, 11, 2000.

1. Field of the Invention

The invention relates in general to an indicating device of a portable computer, and more particularly to an indicating device which applies the optical properties of transparent material to improve the indicating effect.

2. Description of the Related Art

As semiconductor technologies advance by leaps and bounds, electronic components are indispensable to modern equipments. Furthermore, miniaturization has been the goal of electronic equipment producers resulting in mini-television, mini-camera and so on. Among these electronic products, computers, especially portable computers, have become crucial tools in just about every field nowadays due to its portability, simplicity, and size.

Status indicating lights are indispensable for portable computers. They function to show the operating status, such as standby mode, storage mode, power charge mode, caps lock mode and numeric lock mode, of the portable computers. Liquid Crystal Display (LCD) and a Light Emitting Diode (LED) are two common types of the status indicating lights.

However, LCD has the disadvantage of high cost of fabricating and maintaining. LED, even with lower cost, suffers from the problem of inferior lighting effect. That is mainly because the front panel is narrow (normally less than 1 cm), and the lightness of LED after transmitting through the front panel is reduced.

SUMMARY OF THE INVENTION

It is therefore an object of the invention to provide an indicating device of a portable computer for indicating various computer statuses. The indicating device applies the optical properties of transparent materials to improve the indicating effect of LEDs.

The invention achieves the above-identified objects by providing a status indicating device of a portable computer. The status indicating device indicates a number of statuses of the portable computer. The status indicating device includes a number of LEDs and a light guiding board. The LEDs emit light corresponding to each status. The light guiding board further includes the first surface, the second surface and the third surface. The first surface receives the light emitted from LEDs. The second surface reflects the light received by the first surface. The light reflected by the second surface is transmitted through the third surface to indicate the statuses of the portable computer.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
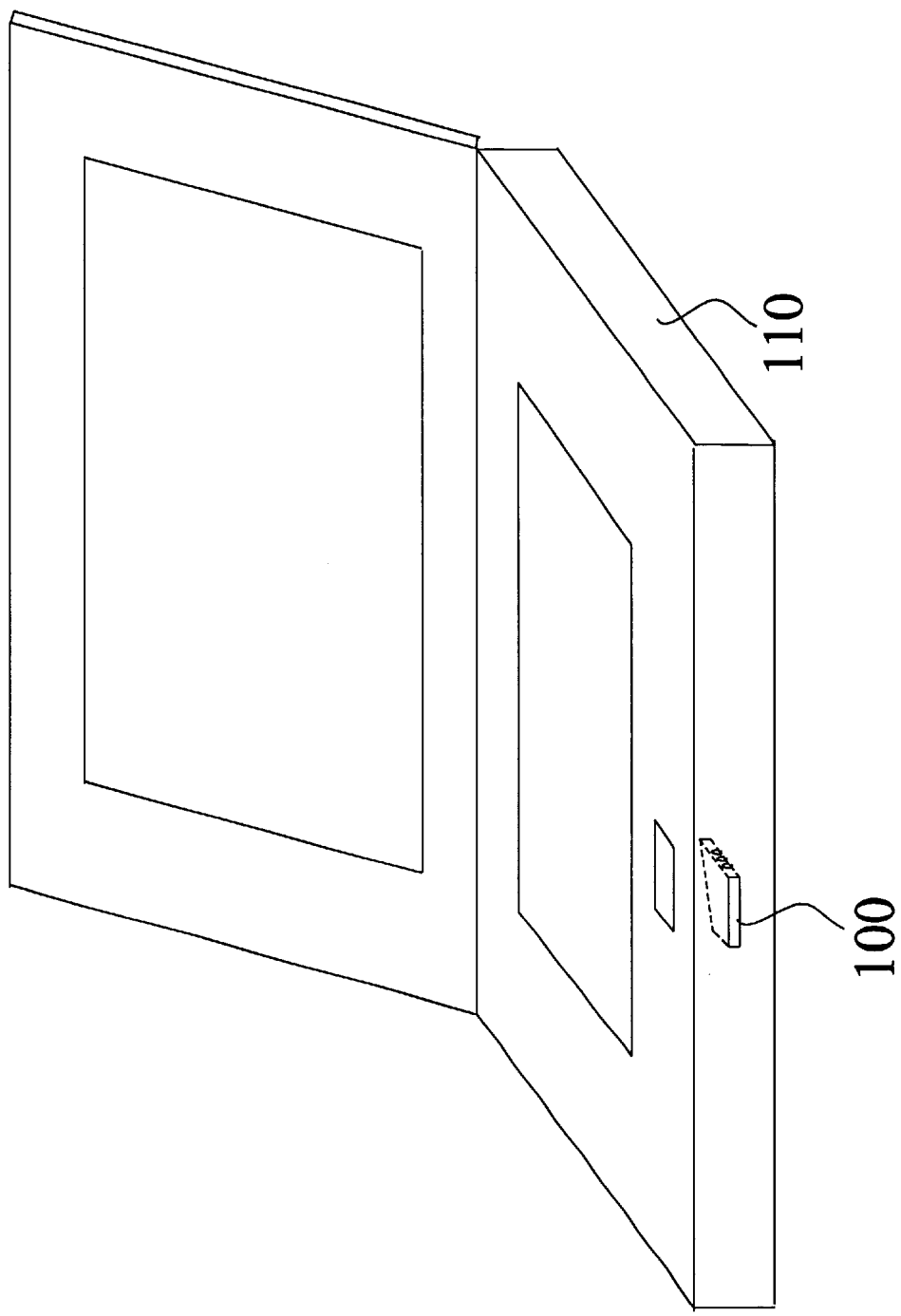
FIG. 1 illustrates the structure of the portable computer according to a preferred embodiment of the invention.

As depicted in FIG. 1, the status indicating device 100 is installed in a portable computer 110. The status indicating device 100 indicates different status of the portable computer by showing different light signals such as different colors.

Figure 2:
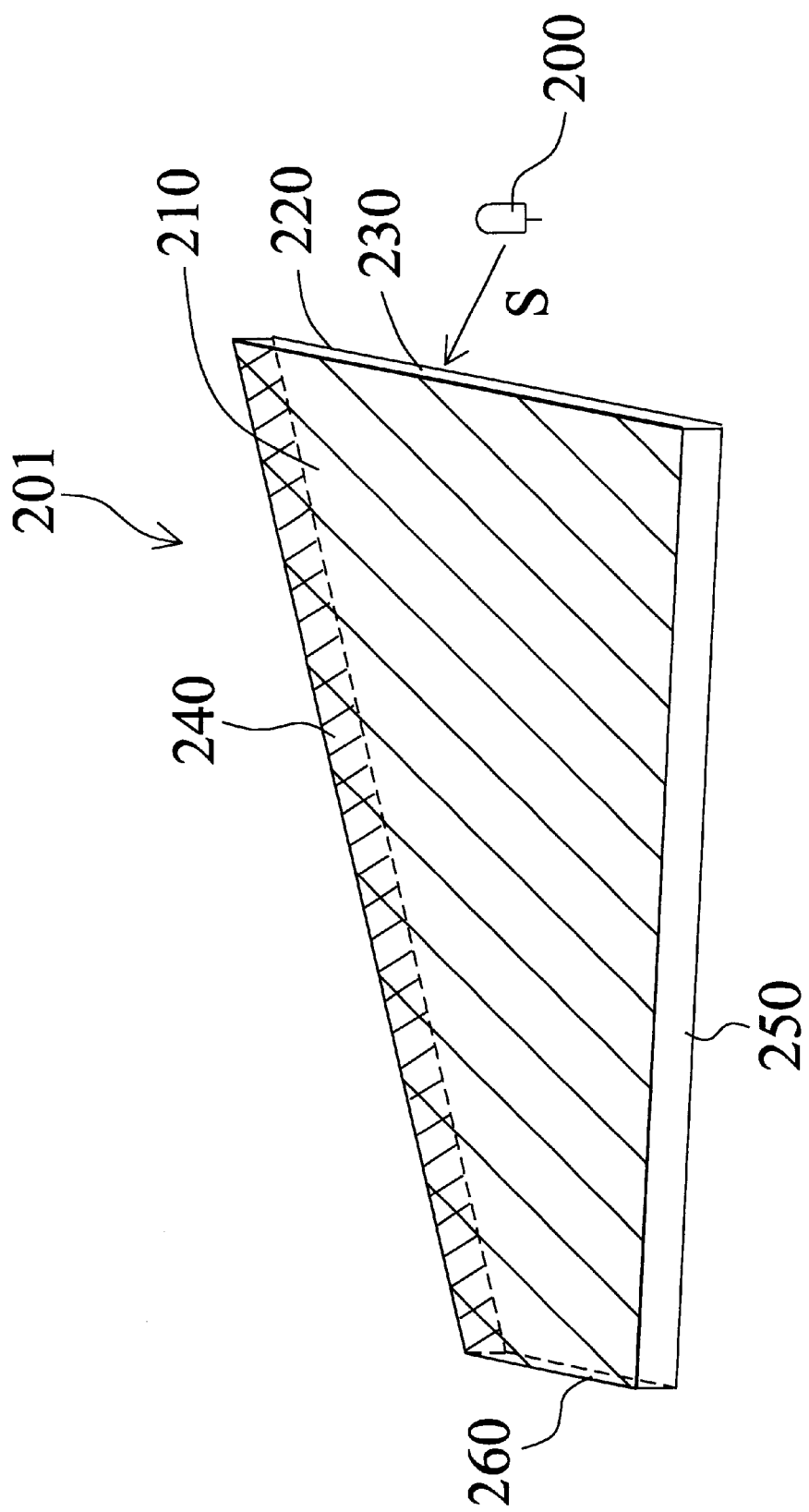
FIG. 2 shows the structure of the status indicating device of the notebook computer according to a preferred embodiment of the invention.

As shown in FIG. 2, the status indicating device 100 includes LEDs 200 and a light guiding board 201. Light S corresponding to the computer status is emitted from the LED and guided by the light guiding board 201. The light guiding board 201 further includes the first trapezoid surface 210, the second trapezoid surface 220, the first surface 230, the second surface 240, the third surface 250, and the fourth surface 260. The first and the second trapezoid surfaces 210 and 220 are equal in shape and are parallel to each other. The light guiding board 201 is made of transparent material, for example, an acrylic or glass material.

Figure 3:
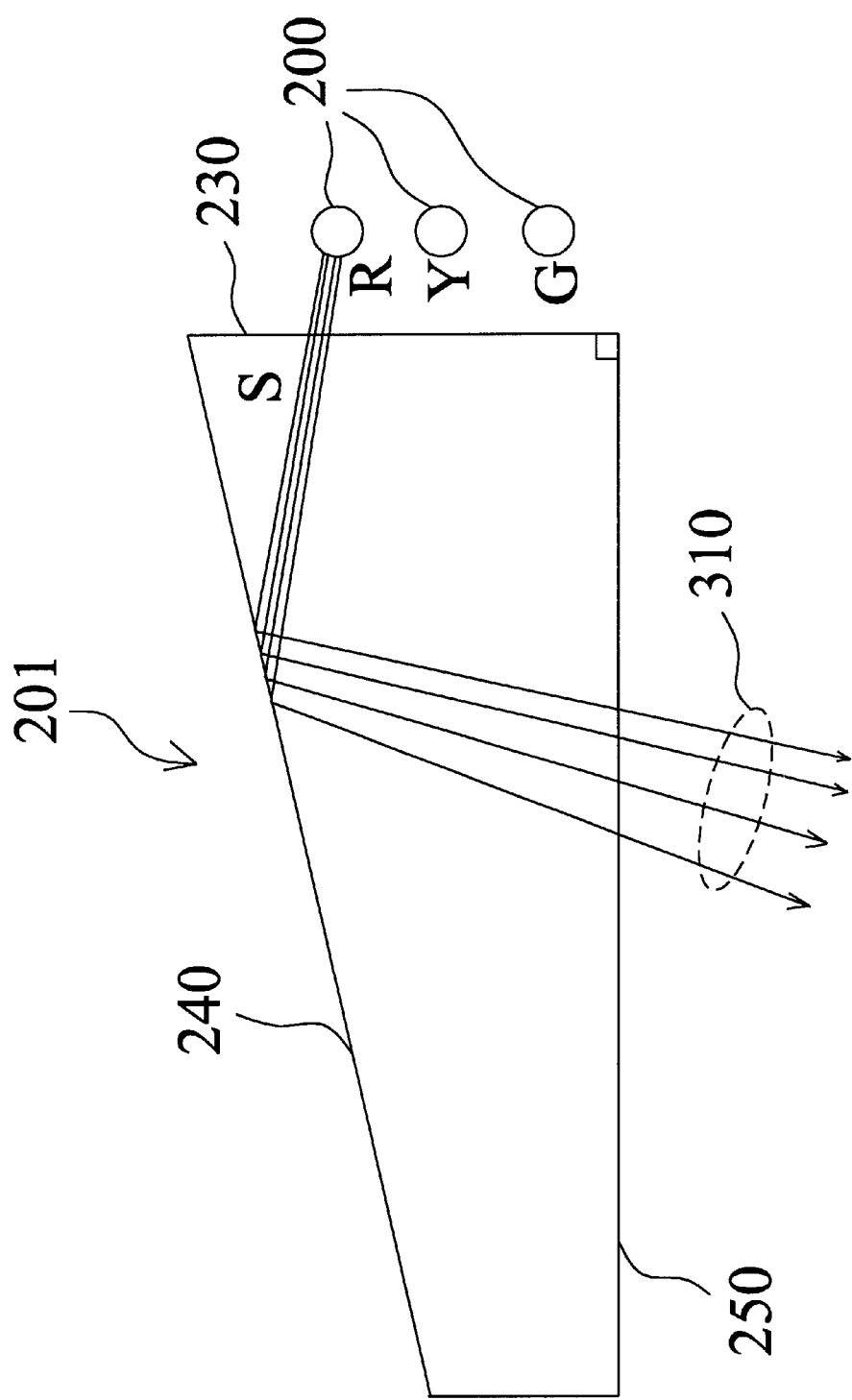
FIG. 3 shows the operation of the status indicating device of the notebook computer according to a preferred embodiment of the invention.

As FIG. 3 is illustrated, light S is emitted from the LED 200 near the first surface 230. Light S is then transmitted through the first surface 230 and reflected by the second surface 240. The reflected light is then transmitted through the third surface 250 to form a diffusion light 310, which has superior lightness.

In order to increase the light guiding efficiency of the light guiding board 201, the first trapezoid surface 210, the second trapezoid surface 220, the second surface 240 and the fourth surface 260 of the light guiding board 201 are all covered by a wrapping, such as mercury or aluminum foil. This wrapping improves the reflecting effects of these surfaces and avoids unnecessary energy loss as the light S is emitted from the LEDs 200, thus the light-guiding efficiency is enhanced. Further more, LEDs 210 with different light color, such as red light R, yellow light Y and green G, are used to indicate different status of the computer.

One character of the invention is that the light emitted by the LEDs is guided by the light guiding board and forms diffusion light by aid of the reflecting and transmitting property of the transparent material. The magnificently brilliant diffusion light enhances the effect of status indicating.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A status indicating device of a portable computer, wherein the status indicating device indicates a plurality of statuses of the portable computer, comprising:
   a plurality of light emitting diodes, which emit light corresponding to each status; and
   a light guiding board having a first, a second, a third, a fourth, a fifth and a sixth surface, said first, second, third and fourth surfaces collectively forming an edge of said light guiding board,
      wherein each of said first, second, third and fourth surfaces has a rectangular shape, said first surface being contiguously connected to said second surface and to said third surface, said first surface and said third surface forming a right angle, and said first surface and said second surface forming an acute angle, said first surface and said fourth surface being parallel to each other, and wherein said fifth surface and said sixth surface are each trapezoidally-shaped, are arranged parallel to each other, and are disposed perpendicular to said first, second, third and fourth surfaces, each of said first surface, said second surface, said third surface and said fourth surface being connected to respective edges of each of said fifth and sixth surfaces;

said light guiding board guiding and diffusing the light emitted by the diodes and indicating the status, wherein said first surface receives the light emitted from the LEDs;

said second surface reflects the light received by said first surface; and the light reflected by said second surface is transmitted through said third surface to indicate the status of the portable computer.

2. The indicating device according to claim 1, wherein the statuses of the portable computer include standby mode, storage mode, power charging mode, caps lock mode and numeric lock mode.

3. The indicating device according to claim 1, wherein the light guiding board is made of acrylic material.

4. The indicating device according to claim 1, wherein the light guiding board is made of glass.

5. The indicating device according to claim 1, wherein the second surface is wrapped.

6. The indicating device according to claim 5, wherein the second surface is wrapped by mercury.

7. The indicating device according to claim 5, wherein the second surface is wrapped by aluminum foil.

8. A status indicating device which indicates a plurality of statuses, comprising:

a plurality of light emitting diodes, which emit light corresponding to each status; and a light guiding board having a first, a second, a third, a fourth, a fifth and a sixth surface, said first, second, third and fourth surfaces collectively forming an edge of said light guiding board, wherein each of said first, second, third and fourth surfaces has a rectangular shape, said first surface being contiguously connected to said second surface and to said third surface, said first surface and said third surface forming a right angle, and said first surface and said second surface forming an acute angle, said first surface and said fourth surface being parallel to each other, and wherein said fifth surface and said sixth surface are each trapezoidally-shaped, are arranged parallel to each other, and are disposed perpendicular to said first, second, third and fourth surfaces, each of said first surface, said second surface, said third surface and said fourth surface being connected to respective edges of each of said fifth and sixth surfaces;

said light guiding board guiding and diffusing the light emitted by the diodes and indicating the status, wherein said first surface receives the light emitted from the LEDs; said second surface reflects the light received by said first surface; and the light reflected by said second surface is transmitted through said third surface to indicate the statuses.

9. The indicating device according to claim 8, wherein the light guiding board is made of acrylic material.

10. The indicating device according to claim 8, wherein the light guiding board is made of glass.

11. The indicating device according to claim 8, wherein the second surface is wrapped.

12. The indicating device according to claim 11, wherein the second surface is wrapped by mercury.

13. The indicating device according to claim 11, wherein the second surface is wrapped by aluminum foil.

* * * * *